US012812621B2

(12) United States Patent
Bontu et al.

(10) Patent No.: US 12,812,621 B2
(45) Date of Patent: Nov. 24, 2026

(54) ELECTROMAGNETIC-FIELD-EMISSION-LIMITING RESOURCE ALLOCATION

(71) Applicant: Telefonaktiebolaget LM Ericsson (publ), Stockholm (SE)

(72) Inventors: Chandra Bontu, Nepean (CA); Amr El-Keyi, Kanata (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 294 days.

(21) Appl. No.: 18/565,307

(22) PCT Filed: Jun. 7, 2021

(86) PCT No.: PCT/IB2021/055001
§ 371 (c)(1),
(2) Date: Nov. 29, 2023

(87) PCT Pub. No.: WO2022/259016
PCT Pub. Date: Dec. 15, 2022

(65) Prior Publication Data
US 2024/0373415 A1 Nov. 7, 2024

(51) Int. Cl.
*H04L 5/00* (2006.01)
*H04W 52/36* (2009.01)
*H04W 72/044* (2023.01)

(52) U.S. Cl.
CPC ......... *H04W 72/046* (2013.01); *H04L 5/0064* (2013.01); *H04W 52/365* (2013.01)

(58) Field of Classification Search
CPC .. H04W 72/046; H04W 52/365; H04L 5/0064
See application file for complete search history.

(56) References Cited

U.S. PATENT DOCUMENTS 9,204,332 B2 * 12/2015 Chaudhuri ........ H04W 28/0268
2006/0121946 A1 * 6/2006 Walton ................. H04B 7/0452 455/561

(Continued)

FOREIGN PATENT DOCUMENTS

WO 2021046809 A1 3/2021
WO 2021220036 A1 11/2021

OTHER PUBLICATIONS

International Search Report and Written Opinion dated Mar. 7, 2022 issued in PCT Application No. PCT/IB2021/055001, filed Jun. 7, 2021, consisting of 12 pages.

*Primary Examiner* — Lakeram Jangbahadur
(74) *Attorney, Agent, or Firm* — Sonoda & Kobayashi Intellectual Property Law; Sarvajit S. Patil

(57) ABSTRACT

A method, system and apparatus are disclosed. According to one or more embodiments, a network node is provided. The network node includes processing circuitry configured to determine a respective allocation priority for each of a plurality of wireless devices where each respective allocation priority is based at least on a power headroom with respect to a radio frequency, RF, electro-magnetic-field, EMF, limit and at least one performance metric for a respective wireless device of the plurality of wireless devices, and allocate resources to at least one of the plurality of wireless devices based at least on the respective allocation priorities associated with the plurality of wireless devices.

12 Claims, 11 Drawing Sheets

(56) References Cited

U.S. PATENT DOCUMENTS

| | | | | |
|---|---|---|---|---|
| 2013/0310097 | A1* | 11/2013 | Smith | H04W 72/121<br>455/509 |
| 2014/0274097 | A1* | 9/2014 | Chen | H04W 72/563<br>455/452.1 |
| 2015/0334733 | A1* | 11/2015 | Ren | H04L 5/001<br>370/336 |
| 2018/0167897 | A1* | 6/2018 | Sampath | H04W 52/367 |
| 2020/0396694 | A1* | 12/2020 | Comsa | H04W 52/367 |

* cited by examiner

ELECTROMAGNETIC-FIELD-EMISSION-LIMITING RESOURCE ALLOCATION

CROSS-REFERENCE TO RELATED APPLICATION

This application is a Submission Under 35 U.S.C. § 371 for U.S. National Stage Patent Application of International Application Number: PCT/IB2021/055001, filed Jun. 7, 2021 entitled "ELECTROMAGNETIC-FIELD-EMISSION-LIMITING RESOURCE ALLOCATION," the entirety of which is incorporated herein by reference.

TECHNICAL FIELD

The present disclosure relates to wireless communications, and in particular, to resource allocation based at least on wireless device priorities derived from, for example, power headroom and/or wireless device performance.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

In existing cellular communication systems such as NR and LTE there are restrictions imposed on the time-averaged transmitted power levels or electro-magnetic-field (EMF) exposure. These restrictions may be mandated governmental authorities where the time-averaged transmitted power levels are prohibited from being violated by regulation. These restrictions must be satisfied at each spatial direction. In other words, the average transmit power at time k, $\overline{P}_k(\phi,\theta)$, should not exceed certain level $\eta$, where $\phi$ and $\theta$ are the angles of azimuth and elevation respectively, i.e., $$\overline{P}_k(\phi, \theta) \leq \eta.$$

However, satisfying the radio frequency (RF) EMF limits at each spatial direction is a challenging problem since most existing and future cellular systems have digital, analog, or hybrid beamforming capabilities that spatially shape the radiated RF EMF to provide higher system capacity and/or coverage. That is, in one example, the varying beamforming for one or more transmissions from one or more transmission points/antennas may cause the transmitted power to fluctuate in one or more spatial directions, thereby making meeting the RF EMF limits at each spatial direction challenging.

There are existing solutions where the average transmit power from cellular transmitters is limited by reducing the radio resources utilized for downlink transmission when the total average transmitted power is expected to approach the limits. In other existing solutions, the transmission powers from cellular transmitters are limited by eliminating transmissions or limiting the number of allocated resource blocks to certain wireless devices when the total average transmit in a certain direction is expected to exceed the RF EMF exposure limit. However, one or more of these existing solutions may negatively impact the system capacity. Further, these techniques fail to consider the effect of beamforming at the network node.

SUMMARY

Some embodiments advantageously provide methods, systems, and apparatuses for resource allocation based at least on wireless device priorities derived from, for example, power headroom and/or wireless device performance.

One or more embodiments described herein allocates the available radio resources to downlink wireless device requests in the order of their priority. The wireless device priorities may be derived based at least on the power headroom (i.e., extra power to reach RF EMF limit) in each spatial direction and/or the average wireless device performance, e.g., downlink transmission rate. The wireless device transmissions on the allocated resources in any transmission time interval (TTI) are restricted such as, for example, not exceeding the power headroom allowed in that TTI. Finally, the power headroom in each spatial direction and the expected performance metric for each wireless device are updated using the scheduling decisions (allocated power, resource blocks and utilized beamformers).

In one or more embodiments, the following steps are performed:

- Deriving the scheduling priorities of the wireless devices in a TTI based on both the power headroom in each spatial direction and the average wireless device performance, e.g., downlink transmission rate.
- Assigning each available resource to the wireless device requests in the order of the derived priorities such that the wireless device transmissions on the allocated resource not to exceed the power headroom allowed in that TTI.
- Updating the power headroom in each spatial direction and the expected performance metric for each wireless device using the scheduling decisions (allocated power, resource blocks and utilized beamformers).

According to one aspect of the disclosure, a network node is provided. The network node includes processing circuitry configured to: determine a respective allocation priority for each of a plurality of wireless devices where each respective allocation priority is based at least on a power headroom with respect to a radio frequency, RF, electro-magnetic-field, EMF, limit and at least one performance metric for a respective wireless device of the plurality of wireless devices, and allocate resources to at least one of the plurality of wireless devices based at least on the respective allocation priorities associated with the plurality of wireless devices.

According to one or more embodiments of this aspect, the processing circuitry is further configured to compute the power headroom in a plurality of spatial directions where the power headroom in each of a plurality of spatial directions is configured to prevent the RF EMF limit from being exceeded. According to one or more embodiments of this aspect, the at least one performance metric includes an average scheduled rate for the respective wireless device. According to one or more embodiments of this aspect, the at least one performance metric includes an expected scheduled rate of the respective wireless device in a current transmission time interval, TTI.

According to one or more embodiments of this aspect, the respective allocation priority corresponds to the expected scheduled rate of the respective wireless device, in the current TTI, divided by the average scheduled rate for the respective wireless device. According to one or more embodiments of this aspect, the determining of the respective allocation priority for each of the plurality of wireless devices and the allocation of resources to at least one of the plurality of wireless devices are configured to occur per transmission time interval, TTI. According to one or more embodiments of this aspect, the processing circuitry is further configured to update a spatial power profile for the network node based at least on the allocated resources and a plurality of spatial directions associated with the allocated resources.

According to one or more embodiments of this aspect, a first wireless device with a respective allocation priority is allocated resources associated with a higher at least one of signal to noise plus interference ratio, SINR, and power than resources allocated to a second wireless device having a lower respective allocation priority than the first wireless device, the first and second wireless devices being part of the plurality of wireless devices. According to one or more embodiments of this aspect, the processing circuitry is further configured to, for MIMO communications, pair a first wireless device having a first priority with at least one wireless device of the plurality of wireless devices having an allocation priority lower than the first priority where the first wireless device being part of the plurality of wireless devices. According to one or more embodiments of this aspect, the at least one wireless device corresponds to a subset of the plurality of wireless devices.

According to another aspect of the disclosure, a first wireless device is provided. The first wireless device includes processing circuitry configured to: receive an allocation of resources for transmissions received from a network node where the allocation of resources is based at least on a respective allocation priority of a plurality of wireless devices where each respective allocation priority is based at least on a power headroom with respect to a radio frequency, RF, electro-magnetic-field, EMF, limit and at least one performance metric for a respective wireless device of the plurality of wireless devices, and use the allocated resources for transmission received from the network node.

According to one or more embodiments of this aspect, the power headroom corresponds to a power headroom in a plurality of spatial directions and is configured to prevent the RF EMF limit from being exceeded. According to one or more embodiments of this aspect, the at least one performance metric includes an average scheduled rate for the respective wireless device. According to one or more embodiments of this aspect, the at least one performance metric includes an expected scheduled rate of the respective wireless device in a current transmission time interval, TTI.

According to one or more embodiments of this aspect, the respective allocation priority corresponds to the expected scheduled rate of the respective wireless device, in the current TTI, divided by the average scheduled rate for the respective wireless device. According to one or more embodiments of this aspect, the allocated resources are associated with a higher at least one of signal to noise plus interference ratio, SINR, and power than resources allocated to a second wireless device having a lower respective allocation priority than the first wireless device where the first and second wireless devices is part of the plurality of wireless devices. According to one or more embodiments of this aspect, the first wireless device has a first priority and is paired with at least one wireless device of the plurality of wireless devices having a respective allocation priority lower than the first priority where the first wireless device is part of the plurality of wireless devices. According to one or more embodiments of this aspect, the at least one wireless device corresponds to a subset of the plurality of wireless devices.

According to another aspect of the present disclosure, a method implemented by a network node is provided. A respective allocation priority for each of a plurality of wireless devices is determined where each respective allocation priority is based at least on a power headroom with respect to a radio frequency, RF, electro-magnetic-field, EMF, limit and at least one performance metric for a respective wireless device of the plurality of wireless devices. Resources are allocated to at least one of the plurality of wireless devices based at least on the respective allocation priorities associated with the plurality of wireless devices.

According to one or more embodiments of this aspect, the power headroom in a plurality of spatial directions is computed where the power headroom in each of a plurality of spatial directions is configured to prevent the RF EMF limit from being exceeded. According to one or more embodiments of this aspect, the at least one performance metric includes an average scheduled rate for the respective wireless device. According to one or more embodiments of this aspect, the at least one performance metric includes an expected scheduled rate of the respective wireless device in a current transmission time interval, TTI.

According to one or more embodiments of this aspect, the respective allocation priority corresponds to the expected scheduled rate of the respective wireless device, in the current TTI, divided by the average scheduled rate for the respective wireless device. According to one or more embodiments of this aspect, the determining of the respective allocation priority for each of the plurality of wireless devices and the allocation of resources to at least one of the plurality of wireless devices are configured to occur per transmission time interval, TTI. According to one or more embodiments of this aspect, a spatial power profile for the network node is updated based at least on the allocated resources and a plurality of spatial directions associated with the allocated resources.

According to one or more embodiments of this aspect, a first wireless device with a respective allocation priority is allocated resources associated with a higher at least one of signal to noise plus interference ratio, SINR, and power than resources allocated to a second wireless device having a lower respective allocation priority than the first wireless device where the first and second wireless devices is part of the plurality of wireless devices. According to one or more embodiments of this aspect, for MIMO communications, a first wireless device having a first priority is paired with at least one wireless device of the plurality of wireless devices having an allocation priority lower than the first priority where the first wireless device is part of the plurality of wireless devices. According to one or more embodiments of this aspect, the at least one wireless device corresponds to a subset of the plurality of wireless devices.

According to another aspect of the present disclosure, a method implemented by a first wireless device is provided. An allocation of resources for transmissions received from a network node is received. The allocation of resources is based at least on a respective allocation priority of a plurality of wireless devices where each respective allocation priority is based at least on a power headroom with respect to a radio frequency, RF, electro-magnetic-field, EMF, limit and at least one performance metric for a respective wireless device of the plurality of wireless devices, and using the allocated resources for transmission received from the network node.

According to one or more embodiments of this aspect, the power headroom corresponds to a power headroom in a plurality of spatial directions and is configured to prevent the RF EMF limit from being exceeded. According to one or more embodiments of this aspect, the at least one performance metric includes an average scheduled rate for the respective wireless device. According to one or more embodiments of this aspect, the at least one performance metric includes an expected scheduled rate of the respective wireless device in a current transmission time interval, TTI.

According to one or more embodiments of this aspect, the respective allocation priority corresponds to the expected scheduled rate of the respective wireless device, in the current TTI, divided by the average scheduled rate for the respective wireless device. According to one or more embodiments of this aspect, the allocated resources are associated with a higher at least one of signal to noise plus interference ratio, SINR, and power than resources allocated to a second wireless device having a lower respective allocation priority than the first wireless device, the first and second wireless devices being part of the plurality of wireless devices. According to one or more embodiments of this aspect, the first wireless device has a first priority and is paired with at least one wireless device of the plurality of wireless devices having a respective allocation priority lower than the first priority where the first wireless device is part of the plurality of wireless devices. According to one or more embodiments of this aspect, the at least one wireless device corresponds to a subset of the plurality of wireless devices.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
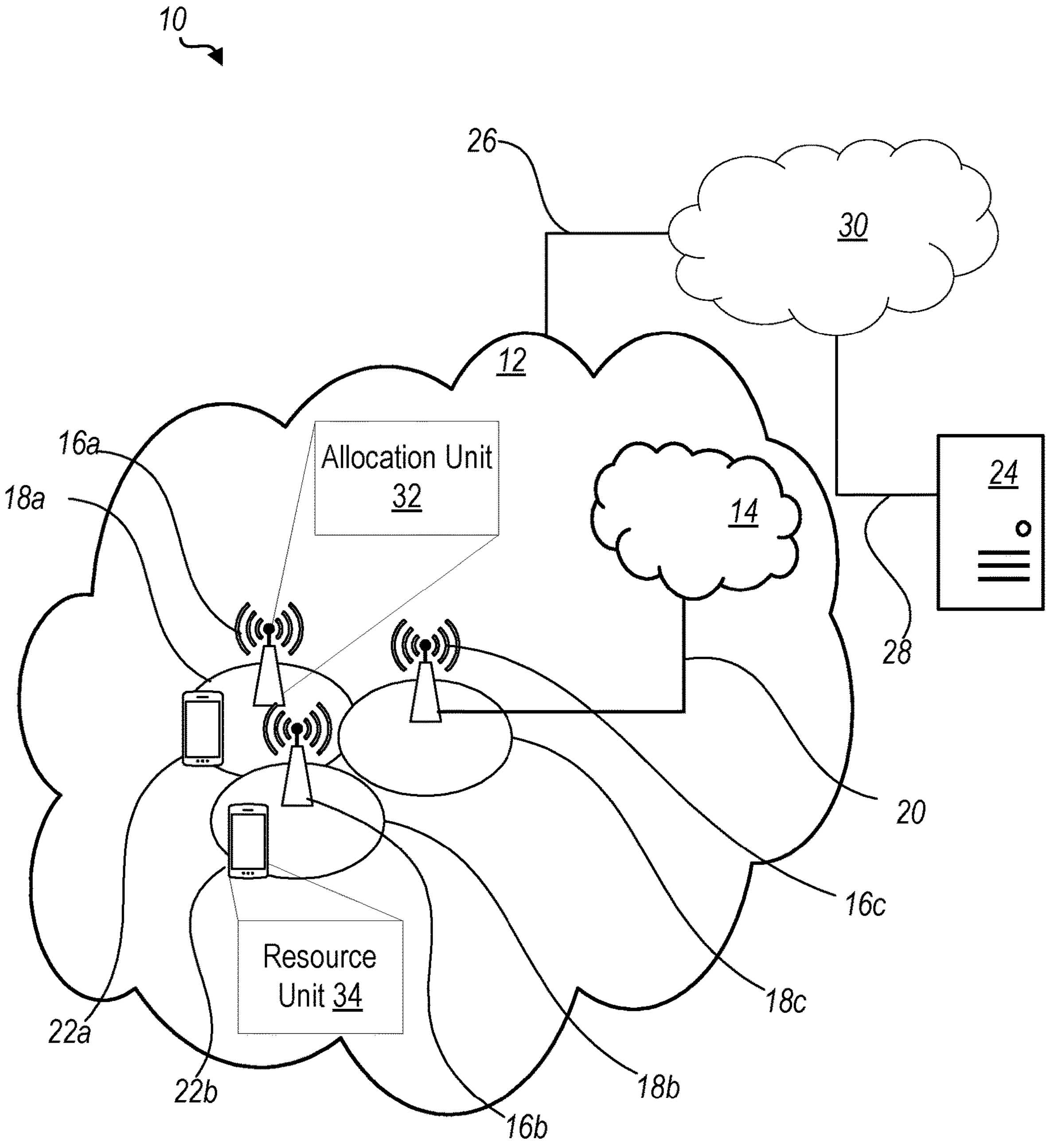
FIG. 1 is a schematic diagram of an example network architecture illustrating a communication system connected via an intermediate network to a host computer according to the principles in the present disclosure.

As described above, there is a need for all the cellular transmitters to measure their average spatial transmission power and implement restrictions on transmissions (e.g., uplink transmission, downlink transmissions) when the EMF exposure is expected to approach the prescribed limits or restrictions. The transmission restrictions may take into consideration the scheduling priority of different wireless devices and/or user fairness constraints, thereby enhancing radio resource utilization and/or user fairness when compared to, for example, the existing solutions.

Before describing in detail example embodiments, it is noted that the embodiments reside primarily in combinations of apparatus components and processing steps related to resource allocation based at least on wireless device priorities derived from, for example, power headroom and/or wireless device performance. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with cellular network, a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, smartphone, any mobile or fixed wireless device capable of communicating with a cellular network and capable of transmitting at power levels exceeding at least one predefined EMF level, etc. The wireless device is capable of transmitting at higher power levels (directional) that exceed one or more predefined electromagnetic frequency (EMF) levels/thresholds/limits.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide resource allocation based at least on wireless device priorities derived from, for example, power headroom and/or wireless device performance and/or wireless link performance.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an allocation unit 32 which is configured to perform one or more network node 16 functions as described herein such as with respect to resource allocation based at least on wireless device 22 priorities derived from, for example, power headroom and/or wireless device performance. A wireless device 22 is configured to include a resource unit 34 which is configured to perform one or more wireless device 22 functions as described herein such as with respect to resource allocation based at least on wireless device priorities derived from, for example, power headroom and/or wireless device performance.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to store, analyze, determine, transmit, receive, forward, relay, etc., information related to resource allocation based at least on wireless device priorities derived from, for example, power headroom and/or wireless device performance.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include allocation unit 32 configured to perform one or more network node 16 functions as described herein such as with respect to resource allocation based at least on wireless device priorities derived from, for example, power headroom and/or wireless device performance.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a resource unit 34 configured to perform one or more wireless device 22 functions as described herein such as with respect to resource allocation based at least on wireless device priorities derived from, for example, power headroom and/or wireless device performance.

Figure 2:
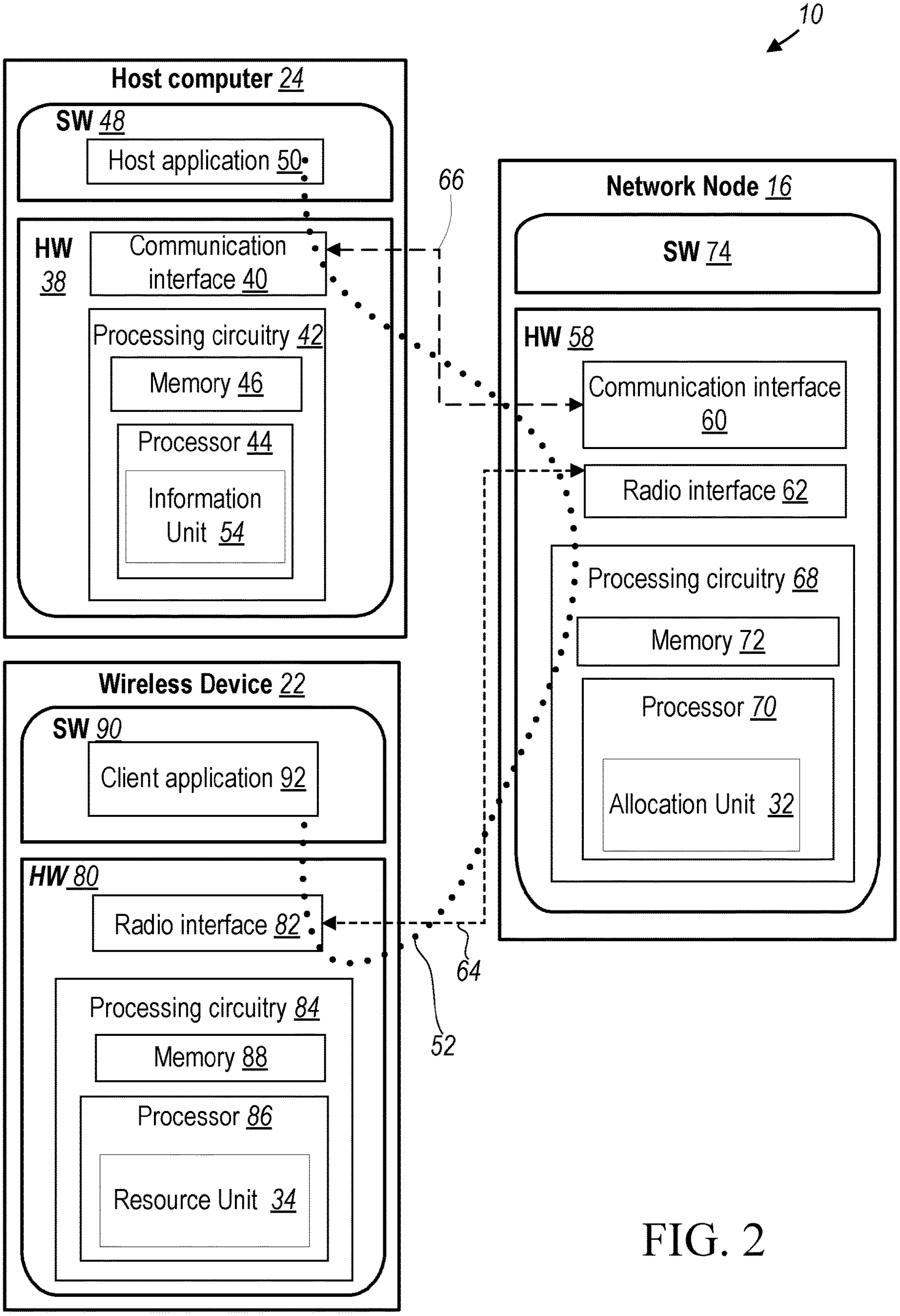
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. The network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as allocation unit 32, and resource unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
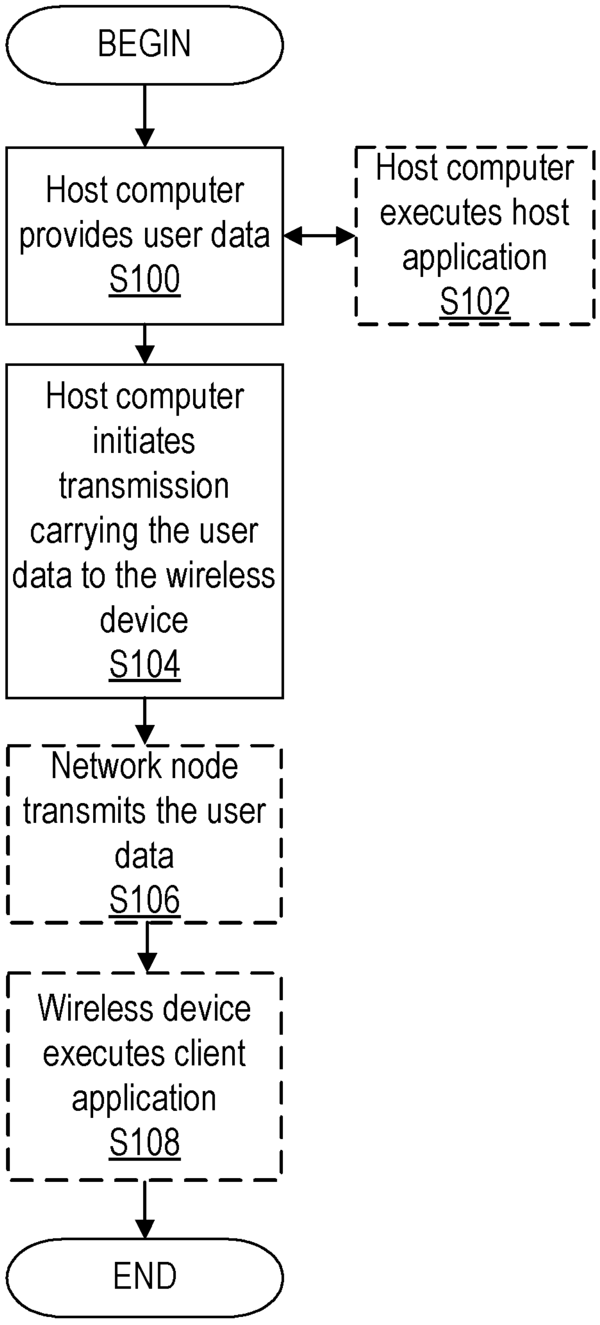
FIG. 3 is a flowchart illustrating example methods implemented in a communication system including a host computer, a network node and a wireless device for executing a client application at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 4:
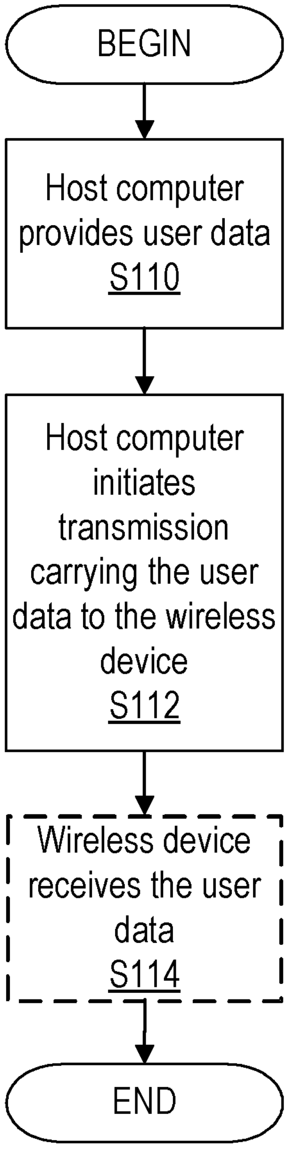
FIG. 4 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
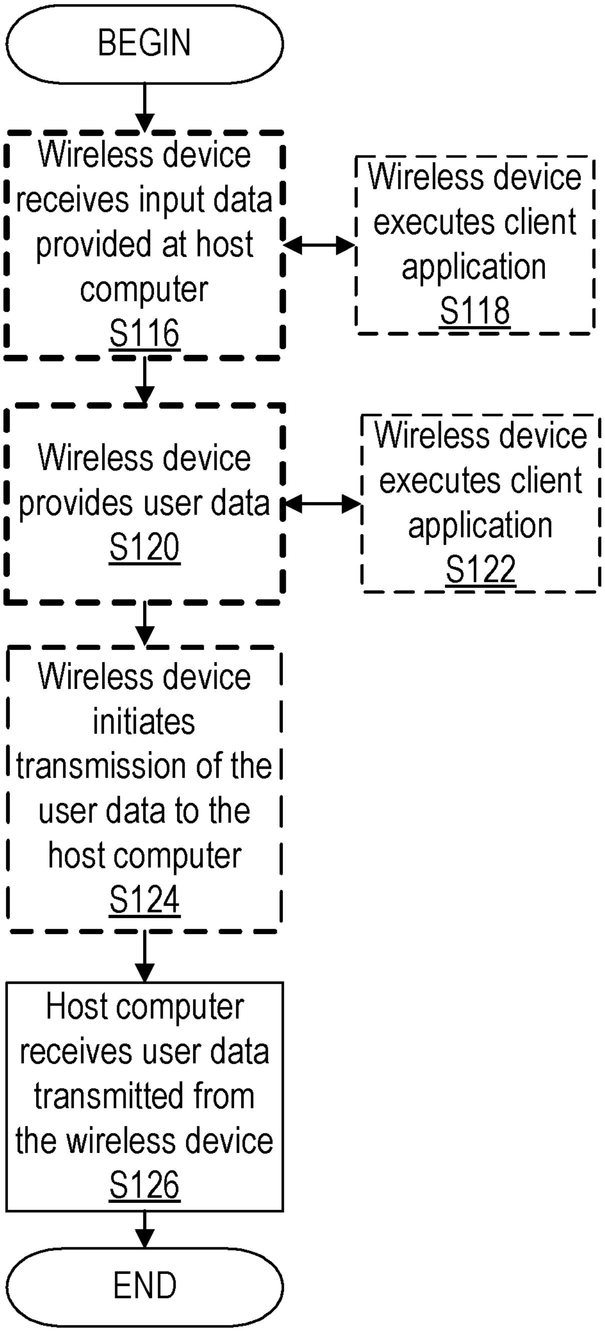
FIG. 5 is a flowchart illustrating example methods implemented in a communication system including a host computer, a network node and a wireless device for receiving user data from the wireless device at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
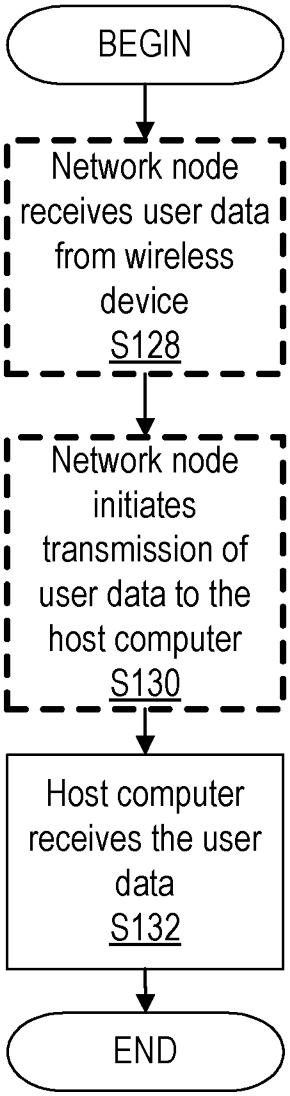
FIG. 6 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
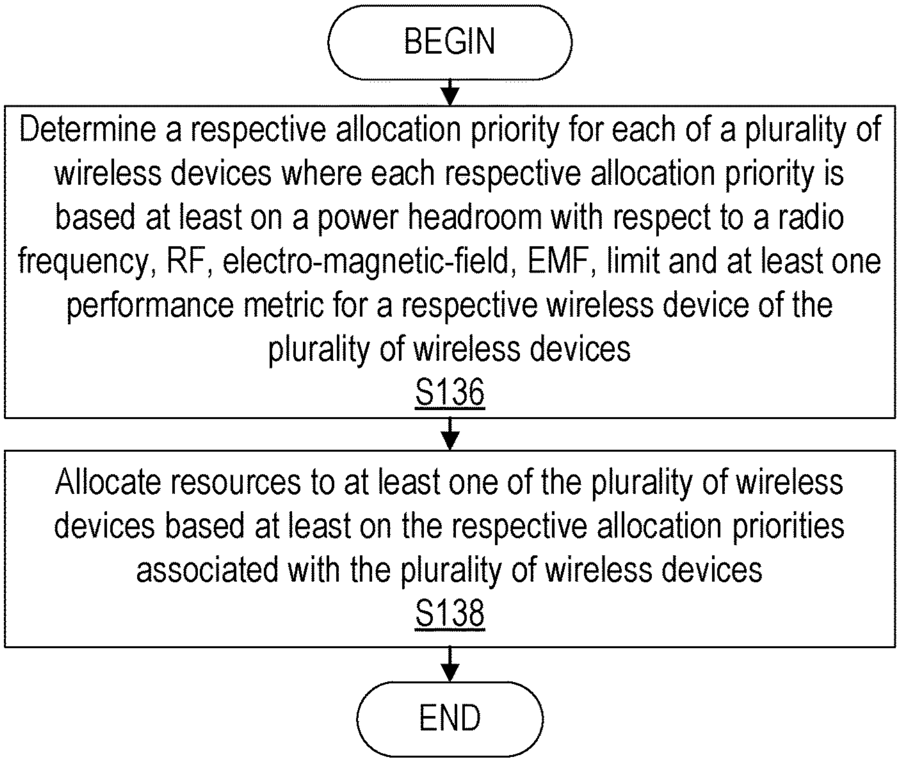
FIG. 7 is a flowchart of an example process in a network node according to some embodiments of the present disclosure.

FIG. 7 is a flowchart of an example process in a network node 16 according to some embodiments of the present disclosure. One or more blocks described herein may be performed by one or more elements of network node 16 such as by one or more of processing circuitry 68 (including the allocation unit 32), processor 70, radio interface 62 and/or communication interface 60. Network node 16 is configured to determine (Block) a respective allocation priority for each of a plurality of wireless devices where each respective allocation priority is based at least on a power headroom with respect to a radio frequency, RF, electro-magnetic-field, EMF, limit and at least one performance metric for a respective wireless device 22 of the plurality of wireless devices 22, as described herein. Network node 16 is configured to allocate resources to at least one of the plurality of wireless devices 22 based at least on the respective allocation priorities associated with the plurality of wireless devices 22, as described herein.

According to one or more embodiments, the processing circuitry 68 is further configured to compute the power headroom in a plurality of spatial directions where the power headroom in each of a plurality of spatial directions is configured to prevent the RF EMF limit from being exceeded, as described herein. According to one or more embodiments, the at least one performance metric includes an average scheduled rate for the respective wireless device 22, as described herein. According to one or more embodiments, the at least one performance metric includes an expected scheduled rate of the respective wireless device 22 in a current transmission time interval, TTI, as described herein.

According to one or more embodiments, the respective allocation priority corresponds to the expected scheduled rate of the respective wireless device 22, in the current TTI, divided by the average scheduled rate for the respective wireless device 22, as described herein. According to one or more embodiments, the determining of the respective allocation priority for each of the plurality of wireless devices and the allocation of resources to at least one of the plurality of wireless devices 22 are configured to occur per transmission time interval, TTI, as described herein. According to one or more embodiments, the processing circuitry 68 is further configured to update a spatial power profile for the network node 16 based at least on the allocated resources and a plurality of spatial directions associated with the allocated resources, as described herein.

According to one or more embodiments, a first wireless device 22 with a respective allocation priority is allocated resources associated with a higher at least one of signal to noise plus interference ratio, SINR, and power than resources allocated to a second wireless device 22 having a lower respective allocation priority than the first wireless device 22 where the first and second wireless devices 22 are part of the plurality of wireless devices 22, as described herein. According to one or more embodiments, the processing circuitry 68 is further configured to, for MIMO communications, pair a first wireless device 22 having a first priority with at least one wireless device 22 of the plurality of wireless devices 22 having an allocation priority lower than the first priority where the first wireless device 22 is part of the plurality of wireless devices 22, as described herein. According to one or more embodiments, the at least one wireless device 22 corresponds to a subset of the plurality of wireless devices 22, as described herein.

Figure 8:
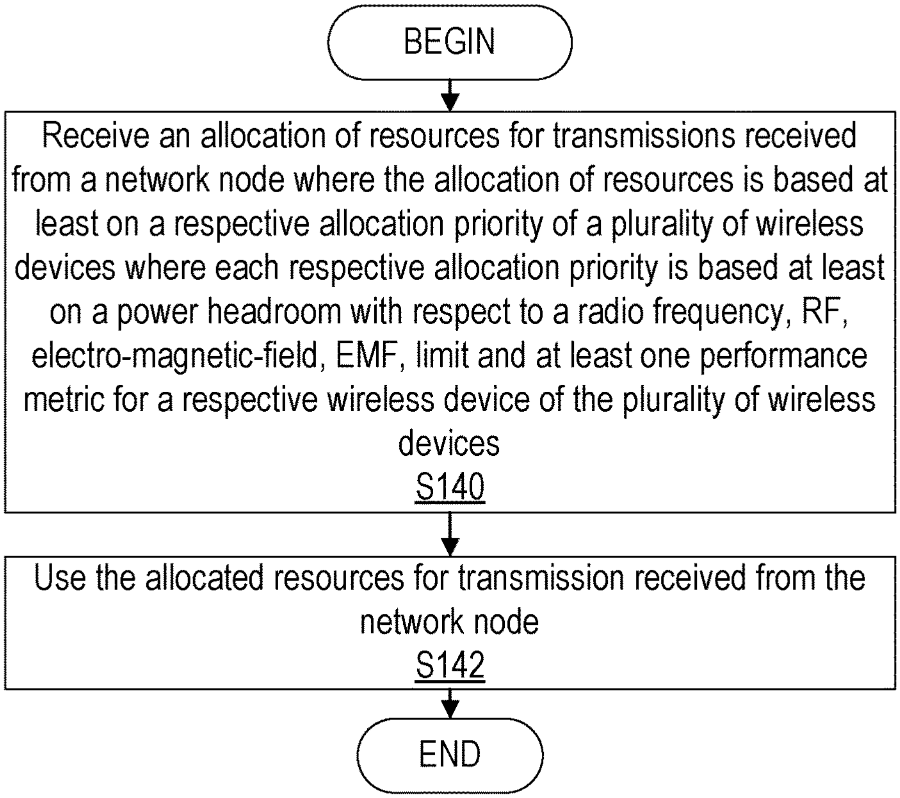
FIG. 8 is a flowchart of an example process in a wireless device according to some embodiments of the present disclosure.

FIG. 8 is a flowchart of an example process in a wireless device 22 according to some embodiments of the present disclosure. One or more blocks described herein may be performed by one or more elements of wireless device 22 such as by one or more of processing circuitry 84 (including the resource unit 34), processor 86, radio interface 82 and/or communication interface 60. Wireless device 22 (e.g., first wireless device 22) is configured to receive an allocation of resources for transmissions received from a network node 16 where the allocation of resources is based at least on a respective allocation priority of a plurality of wireless devices 22 where each respective allocation priority is based at least on a power headroom with respect to a radio frequency, RF, electro-magnetic-field, EMF, limit and at least one performance metric for a respective wireless device 22 of the plurality of wireless devices 22, as described herein. Wireless device 22 is configured to use the allocated resources for transmission received from the network node 16, as described herein.

According to one or more embodiments, the power headroom corresponds to a power headroom in a plurality of spatial directions and is configured to prevent the RF EMF limit from being exceeded, as described herein. According to one or more embodiments, the at least one performance metric includes an average scheduled rate for the respective wireless device 22, as described herein. According to one or more embodiments, the at least one performance metric includes an expected scheduled rate of the respective wireless device 22 in a current transmission time interval, TTI, as described herein.

According to one or more embodiments, the respective allocation priority corresponds to the expected scheduled rate of the respective wireless device 22, in the current TTI, divided by the average scheduled rate for the respective wireless device 22, as described herein. According to one or more embodiments, the allocated resources are associated with a higher at least one of signal to noise plus interference ratio, SINR, and power than resources allocated to a second wireless device 22 having a lower respective allocation priority than the first wireless device 22 where the first and second wireless devices 22 are part of the plurality of wireless devices 22, as described herein. According to one or more embodiments, the first wireless device 22 has a first priority and is paired with at least one wireless device 22 of the plurality of wireless devices 22 having a respective allocation priority lower than the first priority where the first wireless device 22 is part of the plurality of wireless devices 22, as described herein. According to one or more embodiments, the at least one wireless device 22 corresponds to a subset of the plurality of wireless devices 22, as described herein.

Having generally described arrangements for resource allocation based at least on wireless device priorities derived from, for example, power headroom and/or wireless device performance, details for these arrangements, functions and processes are provided as follows, and which may be implemented by the network node 16, wireless device 22 and/or host computer 24.

One or more network node 16 functions described below may be performed by one or more of processing circuitry 68, processor 70, radio interface 62, allocation unit 32, etc. One or more wireless device 22 functions described below may be performed by one or more of processing circuitry 84, processor 86, resource unit 34, radio interface 82, etc. As used herein, "user" may refer to wireless device 22.

Some embodiments provide resource allocation based at least on wireless device priorities derived from, for example, power headroom and/or wireless device performance. According to one or more embodiments, an available radio resource in a transmission time interval (TTI) is allocated to wireless device requests in the order of their priority. The wireless device priorities are derived based at least on the power headroom in each spatial direction and the average wireless device performance, e.g., downlink transmission rate. The instantaneous power headroom is typically determined from a dynamic resource threshold $\gamma(t)$ that is updated by an average power control loop. In existing solutions, $\gamma(t)$ would limit the fraction of the total number of PDSCH resources that may be scheduled at a specific TTI. The power headroom may be expressed as $$P_{Hedroom}(t) = \gamma(t)P_{PDSCH,total} - P_{PDSCH,allocated}(t).$$

This equation is generalized to account for different powers per resource block (PRB), and different beam forming gains per PRB. It may be a matter of definition only if $\gamma(t)$ is defined in terms of a PDSCH (data channel) resource limitation or a total transmit power limitation, the feedback control loop with integration may automatically adjust its value to a correct value, as long as measurements of the average total power are available.

Figure 9:
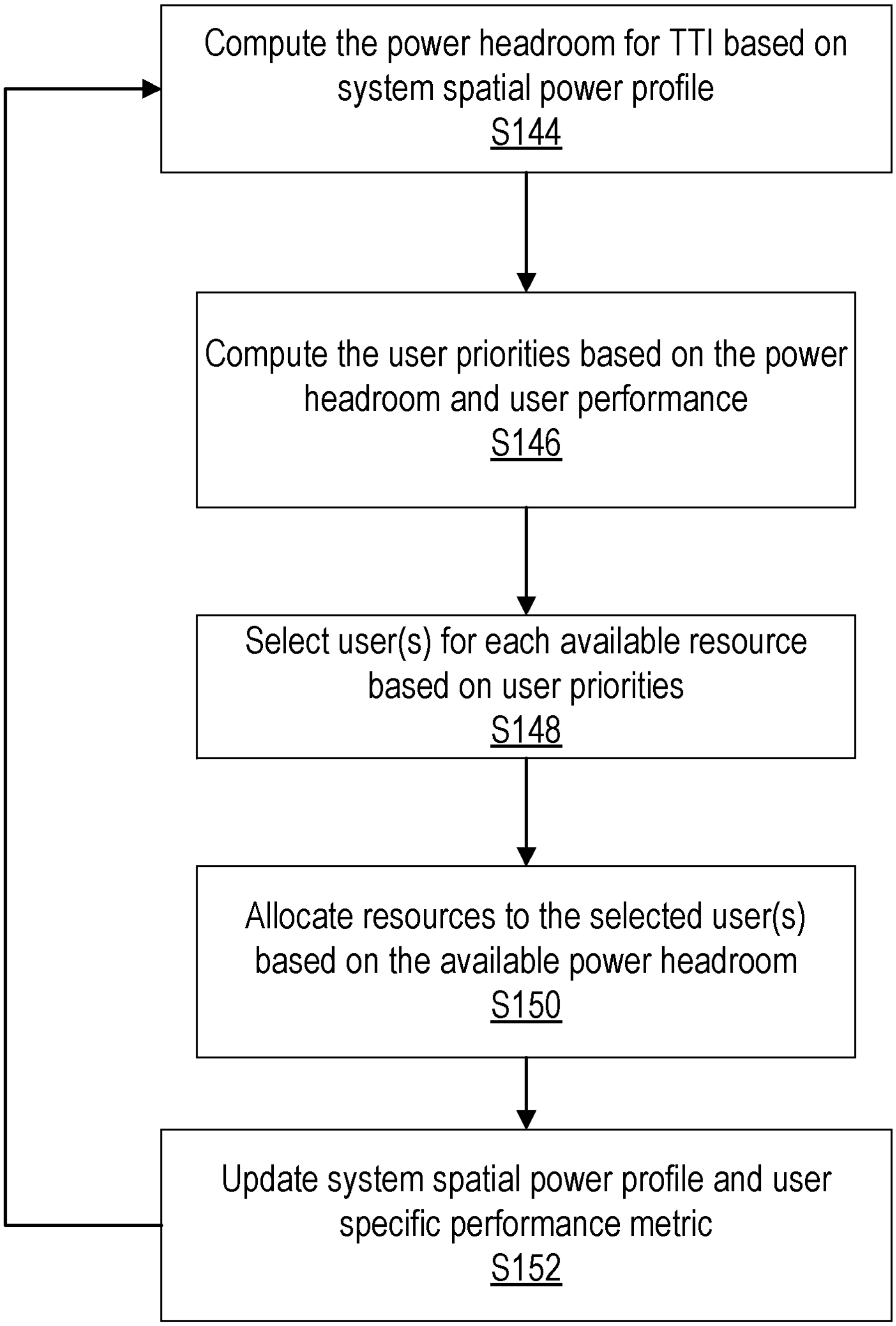
FIG. 9 is flow diagram of another example of a process in the network node according to some embodiments of the present disclosure.

The transmissions towards wireless devices on the allocated resources in any TTI are then restricted not to exceed the power headroom allowed in that TTI. After, the power headroom in each spatial direction and the expected performance metric for each wireless device 22 is updated using the scheduling decisions (allocated power, resource blocks and utilized beamformers). FIG. 9 is a flow diagram of another example process in a network node 16 according to some embodiments of the present disclosure. In particular, in every TTI or in one or more TTIs, the system's spatial transmit power profile is updated based on the allocation of resources and corresponding directions of the allocated transmissions. The network node 16 is configured to compute (Block S144) the power headroom for TTI based at least on system spatial power profile, as described herein.

The network node 16 is configured to compute (Block S146) the wireless device priorities based at least on the power head room and wireless device performance, as described herein. The network node 16 is configured to select (Block S148) wireless device(s) 22 for each available resource based at least on wireless device priorities, as described herein. The network node 16 is configured to allocate (Block S150) resources to the selected wireless device(s) 22 based at least on the available power headroom, as described herein. The network node 16 is configured to update (Block S152) the spatial power profile and wireless device specific performance metric, as described herein.

The details of the steps of the algorithm in FIG. 9 are described below for the cases of single user (SU-) and multiuser (MU-) multiple input multiple output (MIMO) transmission.

SU-MIMO Transmission

Figure 10:
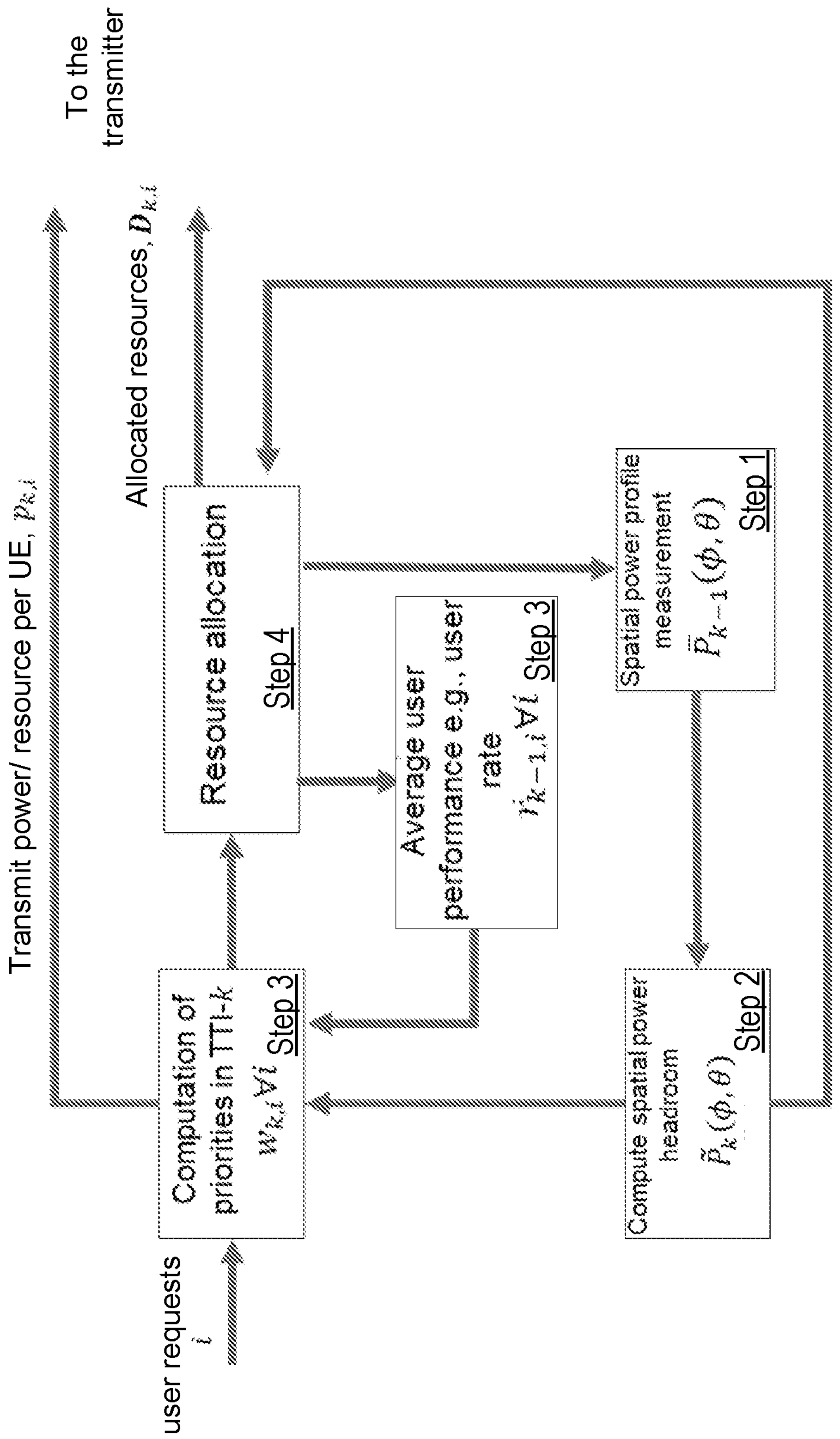
FIG. 10 is a flow diagram associated with an example architecture of a resource allocation algorithm according to some embodiments of the present disclosure.

FIG. 10 is a flow diagram of an example architecture of the allocation algorithm performed by, for example, network node 16, according to some embodiments of the present disclosure. Various steps involved in this procedure are described below. As used herein, user may correspond to wireless device 22.

STEP-1: Spatial Power Profile Measurement

Let $P_{k-1,i}(\phi,\theta)$ denote the spatial power contribution of user-i at time k−1. $P_{k-1,i}(\phi,\theta)$ is computed as $$P_{k-1,i}(\phi, \theta) = \sum_{n \in D_{k-1,i}} \mu_{k-1,i}(n) A_{k-1,i}(n; \phi, \theta)$$

where $D_{k-1,i}$ represents the set of resources allocated to user-i in TTI−(k−1), $\mu_{k-1,i}(n)$ is the instantaneous transmit power of user i on resource n in TTI(k−1), and $A_{k-1,i}(n; \phi,\theta)$ is the far-field response of user-i transmission on resource n in TTI(k−1) at (azimuth, elevation) direction $(\phi,\theta)$ where $$\iint_{(\phi,\theta)} A_{k-1,i}(n; \phi, \theta) d\phi \, d\theta = 1.$$

Note that when beamforming is enabled, the far-field response is typically maximized in the direction of user.

The average spatial power profile at the end of resource allocation at TTI−(k−1), $\overline{P}_{k-1}(\phi,\theta)$, can be computed using a moving-window average that spans the EMF exposure evaluation time interval T, i.e., $$\overline{P}_{k-1}(\phi, \theta) = \sum_{t=K-W_T}^{K-1} \sum_{i=0}^{U_t-1} P_{t,i}(\phi, \theta)$$

where $W_T$ is the number of TTIs spanning the EMF exposure evaluation time interval T and $U_t$ is the number of users scheduled in TTI t. Alternatively, an exponential window time average can be used to compute the average spatial power profile in order to reduce the computational complexity and storage requirements, i.e., $$\overline{P}_{k-1}(\phi, \theta) = \alpha \, \overline{P}_{k-2}(\phi, \theta) + (1-\alpha) \sum_{i=0}^{U_{k-1}-1} P_{k-1,i}(\phi, \theta)$$

where $\alpha$ is forgetting factor that can be selected to provide an effective window length that matches the EMF exposure evaluation time interval $W_T$, i.e., $$\alpha = 1 - \frac{1}{W_T}.$$

STEP-2: Spatial Power Headroom Calculation

During the kth TTI, the transmit power headroom, $\tilde{P}_k(\phi, \theta)$, is computed in each spatial direction to ensure that the instantaneous power limit is not exceeded in any spatial direction during the resource allocation to user requests in the queue, i.e., $$\tilde{P}_k(\phi, \theta) = \eta_k(\phi, \theta) - \overline{P}_{k-1}(\phi, \theta)$$

where $\tilde{P}_k(\phi,\theta)$ represents the maximum transmit power headroom allowed in TTI k in the spatial direction $(\phi,\theta)$, $\eta_k(\phi,\theta)$ is the transmit power limit in the direction $(\phi,\theta)$ that corresponds to a given EMF exposure limit, $\eta(\varnothing,\theta)$, or inter-cell interference limit, $\tilde{\eta}_k(\phi,\theta)$, or a combination of both. For example, $\eta_k(\phi,\theta)$ can be expressed as a combination fixed limits and variable limits which may be changing in time, i.e., $$\eta_k(\phi, \theta) = \min\{\eta(\phi, \theta), \tilde{\eta}_k(\phi, \theta)\}.$$

STEP-3: Prioritization of Users

The priority weights, $w_{k,i}$, at time k, for example, are computed as follows $$w_{k,i} = g(r_{k,i}, \bar{r}_{k-1,i})$$

where $\bar{r}_{k-1,i}$ is the average user scheduled rate up until TTI(k−1), $r_{k,i}$ represents the expected scheduled rate of user i in TTI k, g(.) is a function representing the computation of priority weight from the expected user scheduled rate, $r_{k,i}$, and the average scheduled rate of the user up until TTI(k−1), $\bar{r}_{k-1,i}$. As used herein, user scheduled rate or user rate may correspond to average user performance. The priority weight, for example, can be computed as follows.

$$w_{k,i} = \frac{r_{k,i}}{\bar{r}_{k-1,i}}.$$

The expected user scheduled rate $r_{k,i}$ is given by $$r_{k,i} = f(\gamma_{k,i}, \tilde{P}_{k,i})$$

where $\gamma_{k,i}=\{\gamma_{k,i}(s,n)\}$ for s=0, 1, . . . , $L_i$−1 and n=0, 1, . . . , N−1 is the expected signal to interference plus noise ratio (SINR) for all transmission layers and the resources of UE-i in TTI-k with unit signal power, N is the total number of resources available in the TTI, and $L_i$ represents the number of transmission layers for UE-i. In the above equation $f(.)$ is the function representing the mapping from the unit power SINR and transmission power to the information rate and $\tilde{P}_{k,i}$ is the transmit power potentially available for user i in the kth TTI.

The available transmit power for user i in the kth TTI, $\tilde{P}_{k,i}$, is calculated such that the power headroom in any direction is not exceed, i.e., $$\tilde{P}_{k,i} = \min_{(\phi,\theta)} \frac{\tilde{P}_k(\phi, \theta)}{A_{k,i}(\phi, \theta)}$$

where $$A_{k,i}(\phi, \theta) = \frac{1}{n} \sum_{n=0}^{N-1} A_{k,i}(n; \phi, \theta)$$

is the average far-field response of user-i transmission over all the available resources and N is the total number of resources. The available transmit power for user i in the kth TTI, $\tilde{P}_{k,i}$, can also be approximated as $$\tilde{P}_{k,i} = \frac{\tilde{P}_k(\phi_{max}, \theta_{max})}{A_{k,i}(\phi_{max}, \theta_{max})}$$

where $$(\phi_{max}, \theta_{max}) = \arg \max_{(\phi,\theta)} \{A_{k,i}(\phi, \theta)\}$$

is the spatial direction at which the maximum EMF due to user-i transmission is radiated.

In one example, the user scheduled rate, $r_{k,i}$, can be expressed as follows.

$$r_{k,i} = \sum_{n=0}^{N-1} \sum_{s=0}^{L_i-1} \log_2\left(1 + \frac{\gamma_{k,i}(s, n)\, \mu_{k,i}(n)}{L_i}\right)$$

where $$\mu_{k,i}(n) = \frac{1}{N} \min\{\tilde{P}_{k,i}, P_T\}$$

and $P_T$ the total available transmit power, i.e., the available power is equally distributed among the allocated resources such that the total available transmit power budget and the power headroom are not exceeded.

In another example, the available resources are assigned to the wireless device 22 (e.g., UE) sequentially starting with the resources that yield the highest throughput. Instead of calculating the user scheduled rate $r_{k,i}$ by assuming that the available power budget is divided over the total number of resources, let $N_i$ represent the number of resources that can be allocated to the UE-i with available power of $\tilde{P}_{k,i}$, where $$N_i = \min\left\{\left\lfloor \frac{\tilde{P}_{k,i} N}{P_T} \right\rfloor, N\right\}$$

and each resource is allocated power equal to $$\frac{P_T}{N}.$$

Furthermore, let $C_{k,i}(t(n))$ represent the capacity estimate of UE-i using the resource t(n) where t(n) represents resources ordered in decreasing order of capacity, i.e., $$C_{k,i}(t(n)) > C_{k,i}(t(n+1))$$

and $$C_{k,i}(n) = \sum_{s=0}^{L_i-1} \log_2\left(1 + \frac{\gamma_{k,i}(s, n)\mu_{k,i}(n)}{L_i}\right)$$

and $\mu_{k,i}(n)$ is constant for all the wireless devices 22 as $$\mu_{k,i}(n) = \frac{P_T}{N}.$$

The user scheduled rate, $r_{k,i}$, can therefore be expressed as follows $$r_{k,i} = \sum_{n=0}^{N_i-1} C_{k,i}(t(n))$$

where only the first $N_i$ resources in t(n) are considered in computing the priority weight.

STEP 4: Resource Allocation

In an OFDMA system, where the radio resources in TTI-k are arranged in frequency, the available N radio resources are allocated to the users in the order of user priority, $\{w_{k,i}\}$. The user with the highest weight takes available resources until the user's data is accommodated or until the user total instantaneous transmit power budget exceeds $\tilde{P}_{k,i}$. Subsequently, the users with the next highest weights compete for the remaining resources. The data of user i is transmitted on its allocated resources with a transmitted power of $\mu_{k,i}(n)$ on each resource where $$\mu_{k,i}(n) = \frac{1}{N}\min\{\tilde{P}_{k,i}, P_T\}$$

Figure 11:
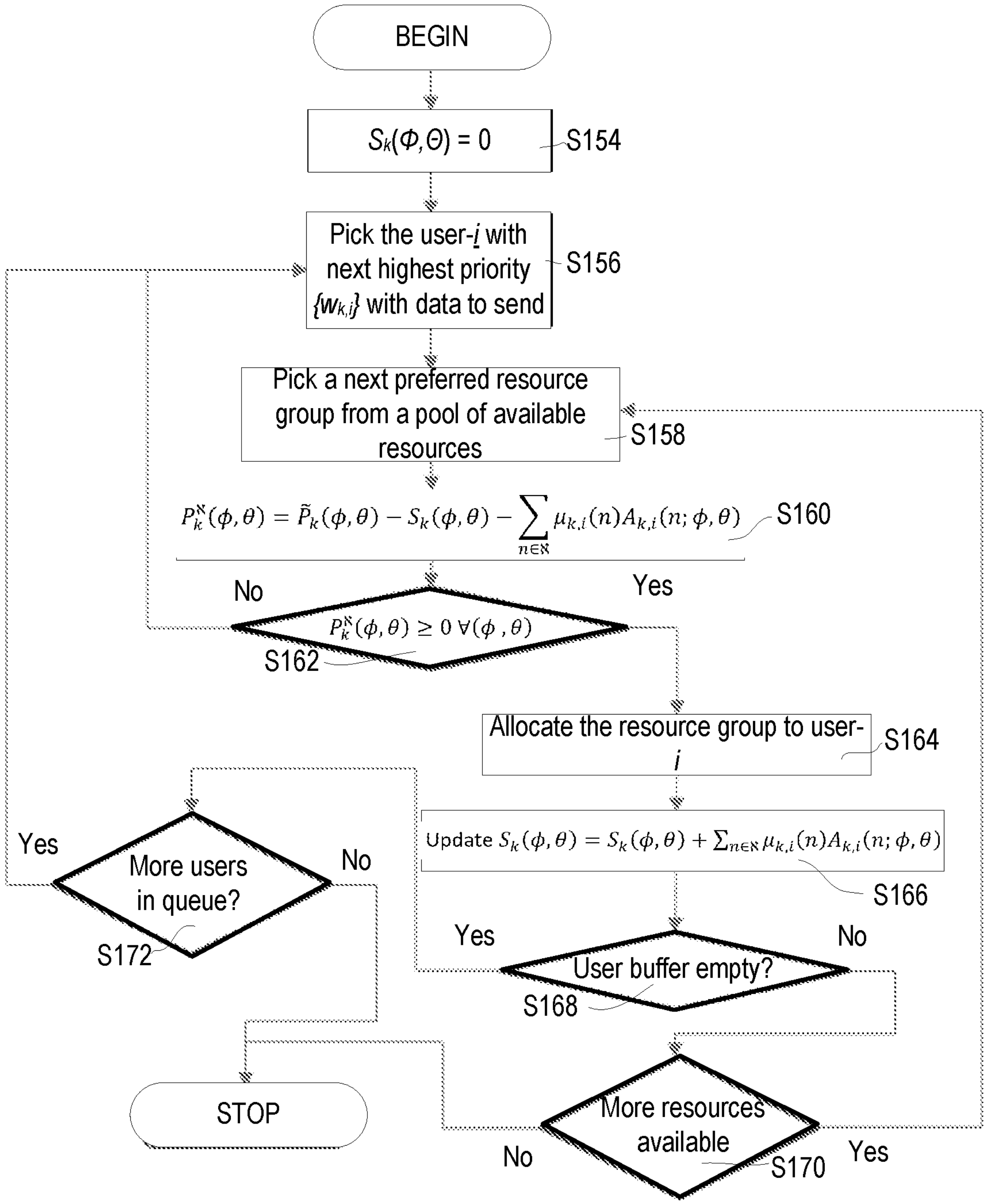
FIG. 11 is a flow diagram of Step 4 in resource allocation for SU-MIMO according to some embodiments of the present disclosure.

FIG. 11 is a flow diagram of an example of resource allocation during Step 4 (above) for the SU-MIMO case according to some embodiments of the present disclosure. The effective transmitted power radiated in each direction $(\phi,\theta)$ due to the current resource allocation in TTI-k, $S_k(\phi,\theta)$, is initialized to zero for each $(\phi,\theta)$ (Block S154). The network node 16 assigns a group of resources sequentially to the users where the group size can be selected as 1 resource or more (Block S156). Let $\aleph$ denote the next set of resources that will be assigned by the scheduler. User-i, the user with the highest priority with data to send in TTI-k, is selected for resource allocation and the next available resource set, $\aleph$, is selected for allocation (Block S158). The remaining power headroom if user-i is given the resource n, $$P_k^n$$

$(\phi,\theta)$, is computed (S160) as follows $$P_k^{\aleph}(\phi, \theta) = \tilde{P}_k(\phi, \theta) - S_k(\phi, \theta) - \sum_{n\in\aleph}\mu_{k,i}(n)A_{k,i}(n; \phi, \theta)$$

where $\tilde{P}_k(\phi,\theta)$ is the power headroom allowed in TTI k in spatial direction $(\phi,\theta)$ calculated in Step 2 described above. If the remaining power headroom, $P_k^{\aleph}$ $(\phi,\theta)$, is positive for all $(\phi,\theta)$, the resources in the group $\aleph$ are assigned to the user i and $S_k(\phi,\theta)$ is updated as $S_K(\phi,\theta)=S_K(\phi,\theta)+\sum_{n\in\aleph}\mu_{k,i}(n)_{k,i}(\eta;\phi,\theta)$ (Blocks S162-S166). Afterwards, the outstanding information data for the user needs to be transmitted is checked by estimating the number of bits that can be transmitted on the allocated resource (Block S168). If the user does not have any outstanding data to send and if there are more resources available (Blocks S170-S172), the next highest priority user in the queue is selected. On the other hand, if the remaining power headroom, $P_k^{\aleph}$ $(\phi,\theta)$, is negative for any $(\phi,\theta)$, the resource is not allocated to any requests from the user (Blocks S162. Instead, the next high priority requests from other users are evaluated for potential allocation.

MU-MIMO Transmission

According to one or more embodiments, an available radio resource in a TTI is simultaneously allocated to the highest priority user request as well as to a set of associated lower priority user requests. The user priorities may be derived or determined based at least on power headroom of each user and the average user request's performance assuming SU-MIMO transmission, i.e., using the algorithms described above in STEP-3: Prioritization of users. The user-set transmissions on the allocated resources are restricted not to exceed the power headroom allowed in the TTI. Hence, Steps 1-3 of the MU-MIMO algorithm are identical to those shown above for SU-MIMO. The changes to step-4 for resource allocation (MU-MIMO case) are described below.

STEP-4 Changes: Resource Allocation

Figure 12:
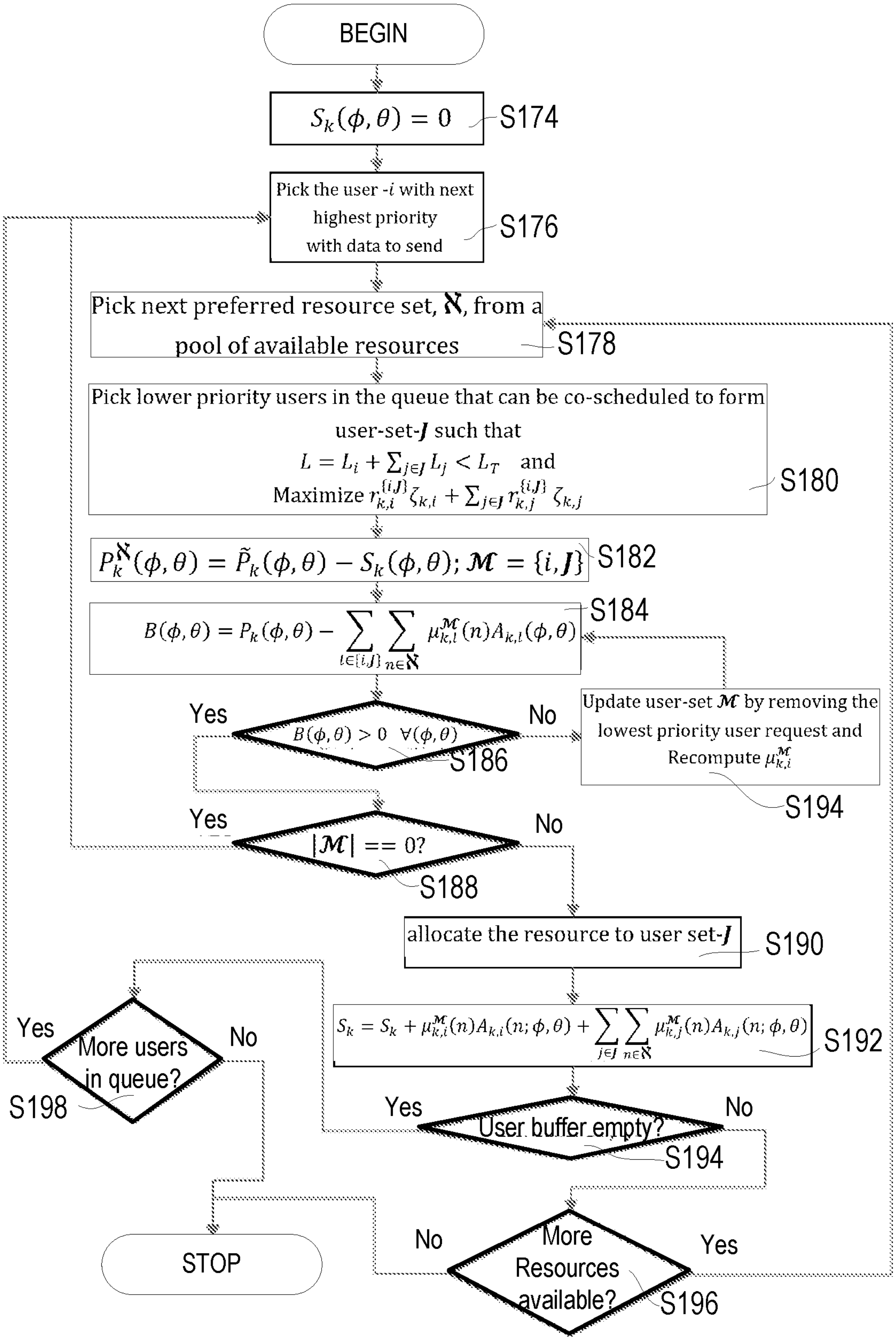
FIG. 12 is a flow diagram of Step 4 in resource allocation for MU-MIMO according to some embodiments of the present disclosure.

The MU-MIMO scheduling algorithm described herein (e.g., the SU-MIMO algorithm where Step 4 is modified) simultaneously schedules the highest priority user alongside with a set of lower priority users on each resource block. FIG. 12 illustrates an example flow diagram of the resource allocation algorithm for MU-MIMO according to some embodiments of the present disclosure. At the beginning of the scheduling algorithm for TTI-k, the effective transmitted power radiated in each direction $(\phi,\theta)$ due to the current resource allocation in TTI-k, $S_k(\phi,\theta)$, is initialized to zero for each $(\phi,\theta)$ (Block S174). The highest priority user in the queue, user-i, is picked for scheduling on its preferred resource set, $\aleph$ (Block S176-S178). Next, a search is performed to pick lower-priority users that can be co-scheduled with user-i on resource n (Block S180). Assume that user set J represents requests from the lower priority users (that have data in the buffer to transmit) in the queue that can be co-scheduled with the highest priority user with data to transfer. Specifically, a user-j is added to user set J, if the following conditions are satisfied.

1. The total number of layers, L, is below a target number, LT.

$$L = L_i + \sum_{l\in J} L_l + L_j \le L_T$$

2. Combined utility metric is maximized, i.e., $$r_{k,i}^{\{i,J,j\}}\zeta_{k,i} + \sum_{l\in J} r_{k,l}^{\{i,J,j\}}\zeta_{k,l} + r_{k,j}^{\{i,J,j\}}\zeta_{k,j} > r_{k,i}^{\{i,J\}}\zeta_{k,i} + \sum_{l\in J} r_{k,l}^{\{i,J\}}\zeta_{k,l}$$

where $$r_{k,j}^{\{R\}}$$

is the expected user scheduled rate if the resource n in TTI k was simultaneously allocated to users in the set R, $\zeta_{k,j}$ is the network utility metric of user j, which is normally expressed as a function of average user throughput up until TTI-k and user fairness. For example, $\zeta_{k,j}$ can be expressed as follows.

$$\zeta_{k,j} = \frac{1}{\bar{r}_{k,j}^{v}}$$

where $$\bar{r}_{k,j} = \beta\bar{r}_{k-1,j} + (1-\beta) r_{k-1,j}^{\{R\}}$$

and v∈[0, ∞] is fairness parameter. The expected user scheduled rate $$r_{k,j}^{\{R\}}$$

can be computed as $$r_{k,j}^{\{R\}} = \sum_{n\in D_{k-1,i}} \sum_{s=0}^{L_i-1} \log_2\left(1 + \gamma_{k,j}(s, n)\mu_{k,j}^{\{R\}}(n)\right)$$

where $$\mu_{k,j}^{\{R\}}$$

is the transmission power of user j when the user set R is picked for MU-MIMO transmission which can be computed as $$\mu_{k,j}^{\{R\}} = \frac{P_T}{NL(R)}$$

or in another example, it can be computed as follows.

$$\mu_{k,i}^{\{R\}} = \frac{1}{NL(R)} \sum_{l\in\{R\}} \tilde{P}_{k,l}$$

where L(R) is the number of layers contributed by the user set R.

After selecting the optimum MU-MIMO user set $\mathcal{M}$ ={i, J} for scheduling on resource set ℵ in TTI-k (Block S182), the user set is tested for transmit power headroom by evaluating B(ϕ,θ) as $$B(\phi, \theta) = \tilde{P}_k(\phi, \theta) - S_k(\phi, \theta) - \sum_{l\in\mathcal{M}} \sum_{n\in\aleph} \mu_{k,l}^{\{\mathcal{M}\}}(n) A_{k,l}(n; \phi, \theta)$$

where $\mu_{k,l}^{\{\mathcal{M}\}}$ is the transmit power for request from user l when the user request when the resource set is co-allocated to requests from user set $\mathcal{M}$ (Block S184). If B(ϕ,θ)>0 ∀(ϕ,θ) (Block S186), then the resource is allocated to the user-set $\mathcal{M}$ (Block S188) and $S_k$(ϕ,θ) is updated (Block S190-S192) as follows:

$$S_k(\phi, \theta) = S_k(\phi, \theta) + \sum_{l\in\mathcal{M}} \sum_{n\in\aleph} \mu_{k,l}^{\mathcal{M}}(n) A_{k,l}(n; \phi, \theta)$$

However, if B(@,θ)<0 for any (ϕ,θ), then the user set $\mathcal{M}$ violates the EMF exposure limit in this direction and the user set $\mathcal{M}$ is modified to satisfy the EMF exposure limits in all directions (Block S194). This is performed by removing the lowest priority user from the set $\mathcal{M}$ and reevaluating B(ϕ,θ) for the modified set after re-computing the transmit power for different users in the modified user set. This process is repeated until the condition, B(ϕ,θ)>0 ∀(ϕ, θ), is satisfied. Note that if the size of the resulting MU-MIMO user set $\mathcal{M}$ is zero, i.e., if all the users in the set are removed to satisfy the EMF exposure limits, then the resource allocation is reevaluated for the next higher priority user request in the queue.

After assigning resource n to the MU-MIMO user set, the outstanding information data for the highest priority user is checked. This is performed by estimating the number of bits that can be transmitted on the allocated resource. If the user does not have any outstanding information to send (Block S194) and if there are more resources available (Block S196), the next highest priority user in the queue is selected (block S198). The scheduling processes are then repeated by the next preferred resource for the highest priority user request with outstanding information.

The described optimization steps can also be applied at wireless device 22. According one embodiment of the prevent disclosure, a wireless device 22 simultaneously communicating with more than one network node 16 or at least one network node 16 and at least another wireless device 22, restricts its transmissions to meet the RF carrier EMF limits by applying the steps described above. Further, wireless device 22 may report the power head room (PHR) report to the serving network node(s) 16 considering the EMF restricted transmission.

Simulation Results

The performance of the directional average power control algorithm described herein is illustrated using example system-level simulations. A 5G cellular system with bandwidth 36 MHz and carrier frequency 3.5 GHz was simulated. The system operates in time division duplex mode where the Downlink/Uplink timeslot pattern is 3/1. A single cell scenario with cell radius 166 meters is considered, where wireless devices 22 are dropped randomly in the simulation area. The 5G SCM Urban Macro channel model with NLOS communication is used in this simulation. The antenna configuration at network node 16 is the 1×4×2 configuration (cross polarized antenna elements of 1 row and 4 columns). The traffic model for the downlink is selected as full buffer.

Single-user codebook-based downlink beamforming is utilized using NR 3GPP Release-15 codebook using 8 CSI-RS codebook-based wireless device 22 feedback and the transmission rank is restricted to Rank 2. The averaging window length of the EMF control algorithm is selected as 6 seconds and a uniform azimuth angular grid of 7 directions was used to enforce the EMF exposure limit. In order to simplify the complexity of the algorithm described herein, the resource allocation set & is selected as the full available bandwidth, i.e., the full set of available resources are allocated to the user (e.g., wireless device 22) with the next highest priority user if the EMF emission limit is not violated by this assignment, else, the downlink allocation request is rejected. In one or more embodiments, the performance of the algorithm described herein can further be improved if a smaller resource allocation set is used. Simulation results are averaged over 50 Monte Carlo runs where the wireless devices are randomly dropped in each simulation and the simulation duration is 36 seconds. As a benchmark, the legacy cell-wide EMF control algorithm and the case with no EMF control are also considered. In addition, the performance of the directional EMF control algorithm is considered where the allowed PRBs for downlink scheduling are limited based on the EMF limit.

Figure 13:
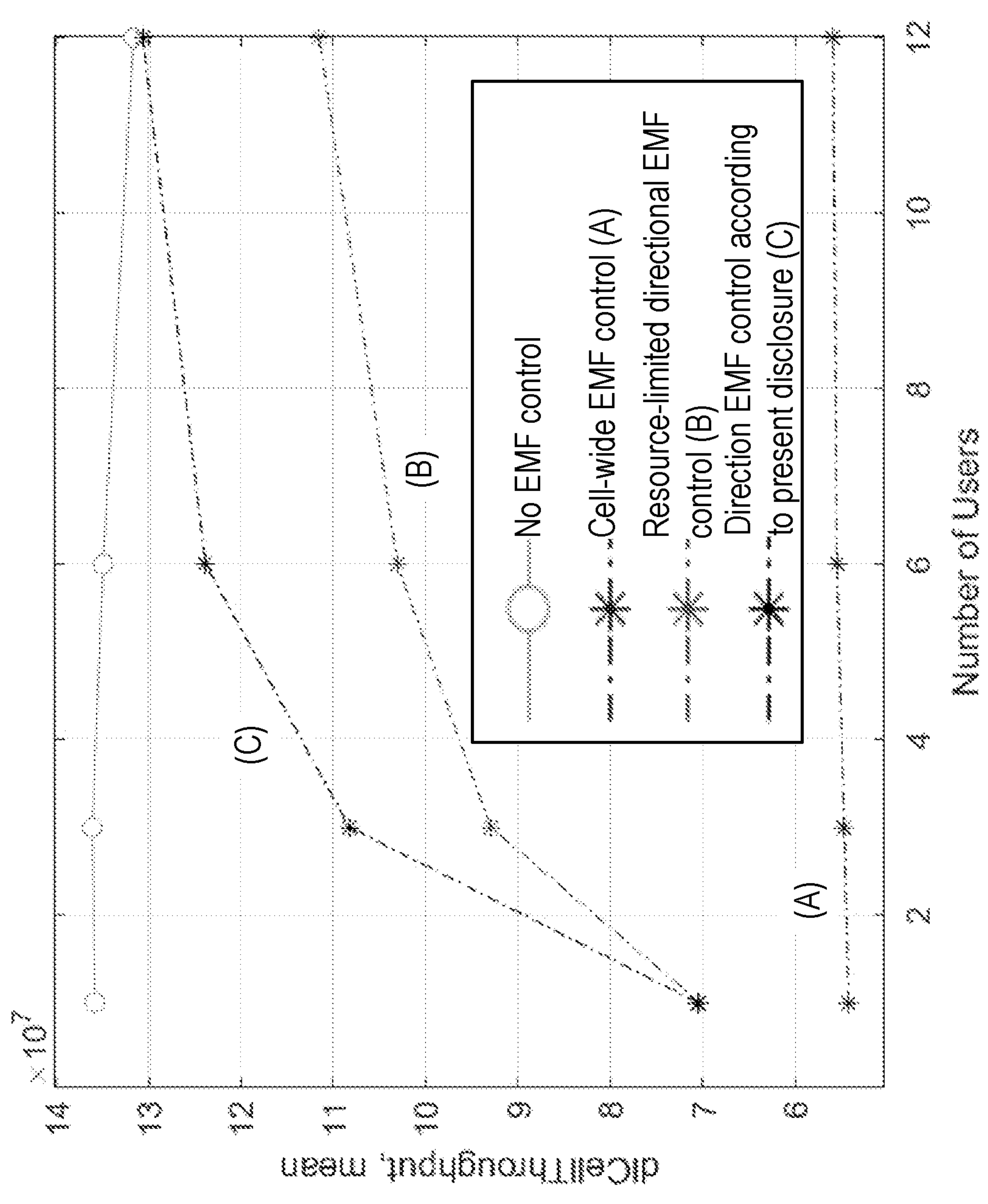
FIG. 13 is a diagram of average downlink cell throughput versus number of active users in a cell.

FIG. 13 is a diagram illustrating an example of the average downlink cell throughput versus the number of active users in the cell. FIG. 13 shows that the directional average EIRP control algorithm that is in accordance with the teachings of the present disclosure provides significant improvement in performance over other EMF control algorithms. The performance improvement increases as the number of available wireless devices 22 for scheduling increases. This can be attributed at least in part to, when the number of scheduled wireless devices increases, the likelihood of contributing to different spatial beams increases, leading to larger performance improvement over existing solutions. Furthermore, the framework described herein in accordance with the teachings of the disclosure allows allocating the available resources to lower priority wireless devices 22 if the highest priority wireless devices 22 cannot be scheduled due to limitations of the threshold if these wireless devices 22 do not violate the threshold. In contrast, an existing algorithm allows scheduling the highest priority wireless devices 22 on a fraction of the resources without, for example, allowing for the scheduling of lower priority wireless devices 22 such that the average power threshold is not violated while the remaining resources are disadvantageously wasted.

Figure 14:
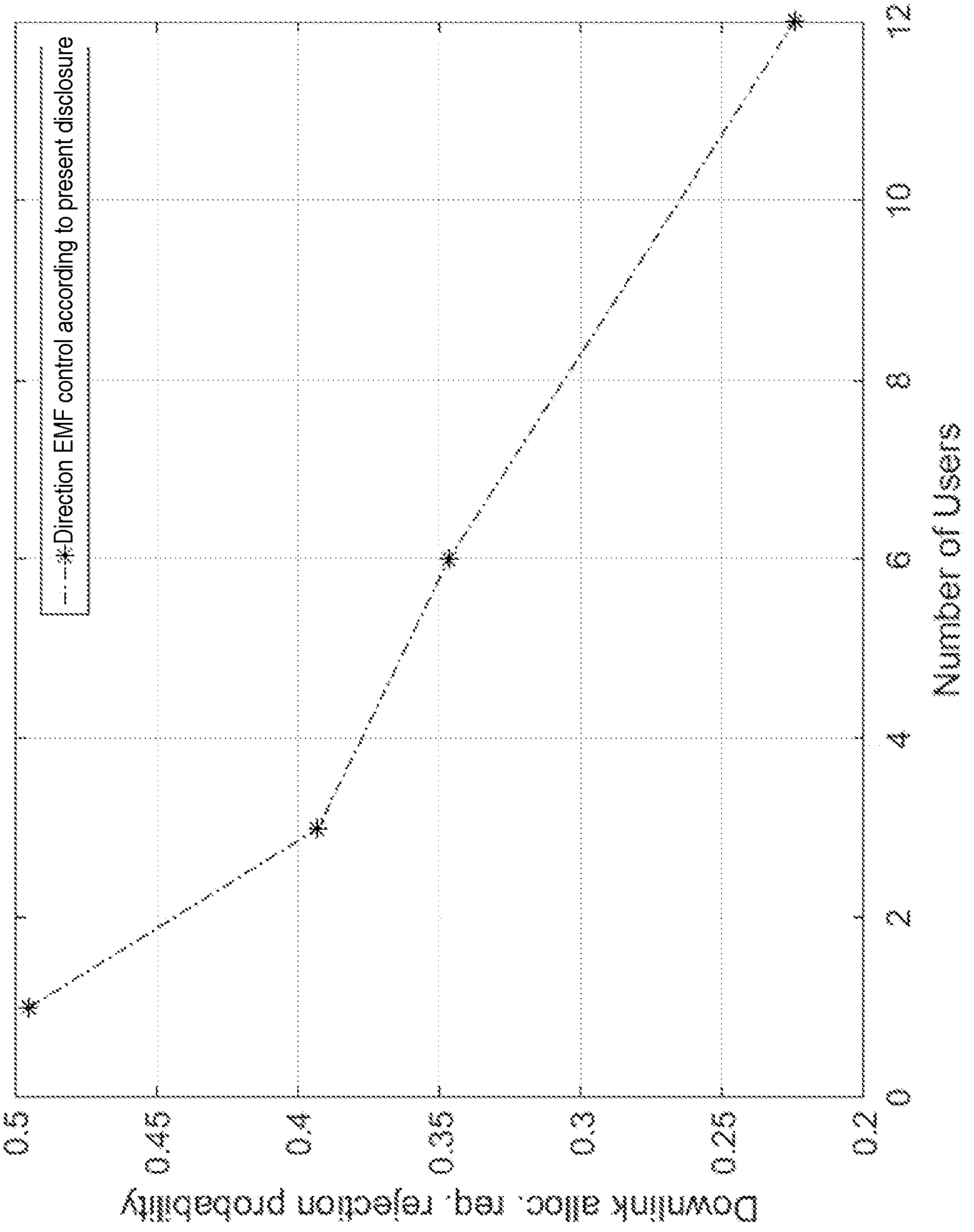
FIG. 14 is a diagram of probability of rejecting the downlink scheduling request versus the number of active users.

FIG. 14 is a diagram illustrating an example of the probability of rejecting the downlink scheduling request versus the number of active users. FIG. 14 illustrates that as the number of active users increases, the downlink transmissions are expected to contribute to different spatial directions, and hence, the probability of triggering the directional average power/EIRP thresholds and rejecting the downlink allocation requests decreases. Furthermore, note that even though some downlink allocation requests are rejected, when there are enough active users in the system, the probability of finding a lower-priority user that does not contribute to the average power-limited spatial directions increases. These two reasons help explain the improvement in downlink cell throughput by the allocation algorithm, described herein, in FIG. 13, as the number of active users in the cell increases.

Accordingly, one or more embodiments provide for:

(1) Deriving the scheduling priorities of the users in a TTI based on both the power headroom in each spatial direction and the average user performance e.g., downlink transmission rate.

(2) Assigning resources to the user requests in the order of the derived priorities such that the user transmissions on the allocated resources in any TTI are restricted not to exceed the power headroom allowed in that TTI.

(3) Update the power headroom in each spatial direction and the expected performance metric for each user using the scheduling decisions (allocated power, resource blocks and utilized beamformers).

Hence, one or more embodiments described herein can fully utilize the available scheduling resources by, in some examples, assigning them to lower-priority wireless devices 22 with downlink beamformers that do not contribute significantly to the average power- or interference-limited spatial directions. Simulation results show that the algorithm described herein provides significant improvement in downlink cell throughput (25% gain) compared to resource-limited average power or interference control algorithms when sufficient number of active users are present in the cell.

One or more embodiments described herein advantageously provide one or more of the following:

- limits the momentary or instantaneous power/EIRP in each spatial direction based on the allocation decisions and the precoders utilized in downlink transmission.
- allows the system to fully utilize the available scheduling resources by assigning them to lower-priority wireless devices 22 with downlink beamformers that do not contribute significantly to the spatial directions where the momentary or instantaneous power headroom is restrictive.
- simulation results show that the algorithm described herein provides significant improvement in downlink cell throughput (25% gain) compared to existing average power control algorithms when sufficient number of active wireless devices are present in the cell.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| AAS | Adaptive or Advanced Antenna Systems |
| DL | Downlink |
| MU-MIMO | Multi-User Multi-Input Multi-Output |
| PRB | Physical Resource Block |
| TTI | Transmission Time Interval |
| UE | User Equipment |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:

processing circuitry configured to:

determine a respective allocation priority for each of a plurality of wireless devices, each respective allocation priority being based at least on a power headroom with respect to a radio frequency, RF, electromagnetic-field, EMF, limit and at least one performance metric for a respective wireless device of the plurality of wireless devices; and allocate resources to at least one of the plurality of wireless devices based at least on the respective allocation priorities associated with the plurality of wireless devices, wherein the at least one performance metric includes an average scheduled rate for the respective wireless device;

wherein the at least one performance metric includes an expected scheduled rate of the respective wireless device in a current transmission time interval, TTI; and wherein the respective allocation priority corresponds to the expected scheduled rate of the respective wireless device, in the current TTI, divided by the average scheduled rate for the respective wireless device.

2. The network node of claim 1, wherein the processing circuitry is further configured to compute the power headroom in a plurality of spatial directions, the power headroom in each of a plurality of spatial directions is configured to prevent the RF EMF limit from being exceeded.

3. The network node of claim 1, wherein the processing circuitry is further configured to update a spatial power profile for the network node based at least on the allocated resources and a plurality of spatial directions associated with the allocated resources.

4. The network node of claim 1, wherein a first wireless device with a respective allocation priority is allocated resources associated with a higher at least one of signal to noise plus interference ratio, SINR, and power than resources allocated to a second wireless device having a lower respective allocation priority than the first wireless device, the first and second wireless devices being part of the plurality of wireless devices.

5. The network node of claim 1, wherein the processing circuitry is further configured to, for MIMO communications, pair a first wireless device having a first priority with at least one wireless device of the plurality of wireless devices having an allocation priority lower than the first priority, the first wireless device being part of the plurality of wireless devices.

6. The network node of claim 5, wherein the at least one wireless device corresponds to a subset of the plurality of wireless devices.

7. A method implemented by a network node, the method comprising:

determining a respective allocation priority for each of a plurality of wireless devices, each respective allocation priority being based at least on a power headroom with respect to a radio frequency, RF, electro-magnetic-field, EMF, limit and at least one performance metric for a respective wireless device of the plurality of wireless devices; and allocating resources to at least one of the plurality of wireless devices based at least on the respective allocation priorities associated with the plurality of wireless devices, wherein the at least one performance metric includes an average scheduled rate for the respective wireless device;

wherein the at least one performance metric includes an expected scheduled rate of the respective wireless device in a current transmission time interval, TTI; and wherein the respective allocation priority corresponds to the expected scheduled rate of the respective wireless device, in the current TTI, divided by the average scheduled rate for the respective wireless device.

8. The method of claim 7, further comprising computing the power headroom in a plurality of spatial directions, the power headroom in each of a plurality of spatial directions is configured to prevent the RF EMF limit from being exceeded.

9. The method of claim 7, further comprising updating a spatial power profile for the network node based at least on the allocated resources and a plurality of spatial directions associated with the allocated resources.

10. The method of claim 7, wherein a first wireless device with a respective allocation priority is allocated resources associated with a higher at least one of signal to noise plus interference ratio, SINR, and power than resources allocated to a second wireless device having a lower respective allocation priority than the first wireless device, the first and second wireless devices being part of the plurality of wireless devices.

11. The method of claim 7, further comprising, for MIMO communications, pairing a first wireless device having a first priority with at least one wireless device of the plurality of wireless devices having an allocation priority lower than the first priority, the first wireless device being part of the plurality of wireless devices.

12. The method of claim 11, wherein the at least one wireless device corresponds to a subset of the plurality of wireless devices.

* * * * *